United States Patent
Niu et al.

(10) Patent No.: US 9,804,275 B2
(45) Date of Patent: Oct. 31, 2017

(54) METHOD AND SYSTEM OF RANDOM-EVENT-BASED COUNT-RATE ADAPTIVE NORMALIZATION FOR PET DETECTOR EFFICIENCY

(71) Applicant: TOSHIBA MEDICAL SYSTEMS CORPORATION, Otawara-shi (JP)

(72) Inventors: Xiaofeng Niu, Mundelein, IL (US); Wenli Wang, Briarcliff Manor, NY (US); Hongwei Ye, Kenosha, WI (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 962 days.

(21) Appl. No.: 14/084,363

(22) Filed: Nov. 19, 2013

(65) Prior Publication Data
US 2015/0142389 A1 May 21, 2015

(51) Int. Cl.
*G01T 1/164* (2006.01)
*G01T 1/29* (2006.01)

(52) U.S. Cl.
CPC .................................. *G01T 1/1647* (2013.01)

(58) Field of Classification Search
CPC .............................. G01T 1/164; G01T 1/2985
See application file for complete search history.

(56) References Cited

U.S. PATENT DOCUMENTS

| 6,774,358 B2 | 8/2004 | Hamill et al. |
| 6,963,065 B2 | 11/2005 | Conti et al. |
| 7,718,954 B2 | 5/2010 | Wang et al. |
| 8,193,505 B2 | 6/2012 | Watson et al. |
| 2007/0176087 A1* | 8/2007 | Wang ..................... G01T 1/1648 250/252.1 |
| 2009/0072154 A1* | 3/2009 | Watson ................... A61B 6/037 250/363.03 |

OTHER PUBLICATIONS

Bailey et al, Quantitative Techniques in PET, 2005, Springer, chapter 5.*

(Continued)

*Primary Examiner* — Janet Suglo
*Assistant Examiner* — Lisa Peters
(74) *Attorney, Agent, or Firm* — Oblon, McClelland, Maier & Neustadt, L.L.P.

(57) ABSTRACT

A method and apparatus for generating crystal efficiency correction factors by performing a normalization calibration based on delayed data. The method and apparatus obtain delayed data from a scan of a patient using a Positron Emission Tomography (PET) scanner, generate a sinogram from the obtained delayed data, determine, using a processing circuit, mean fan and block line of response sensitivities from the generated sinogram, determine, using the processing circuit, mean detector efficiency based on the determined mean fan and block line of response sensitivities, determine, using the processing circuit, an individual crystal efficiency based on the determined mean fan and block line of response sensitivities and the mean detector efficiency for each module, and calculate the crystal efficiency correction factors based on the determined individual crystal efficiency of each module.

16 Claims, 9 Drawing Sheets

(56) References Cited

OTHER PUBLICATIONS

R. D. Badawi, et al. "Algorithms for Calculating Detector Efficiency Normalization Coefficients for True Coincidences in 3D PET"; Phys. Med. Biol. 43, (1998); pp. 189-205.
John M. Ollinger, "Detector Efficiency and Compton Scatter in Fully 3D PET"; IEEE Transactions on Nuclear Science, vol. 42, No. 4, Aug. 1995; pp. 1168-1173.
Wenli Wang, et al. "A New Component Approach to Efficiency Normalization for 3D PET"; IEEE Transactions on Nuclear Science, vol. 54, No. 1, Feb. 2007; pp. 92-99.

* cited by examiner

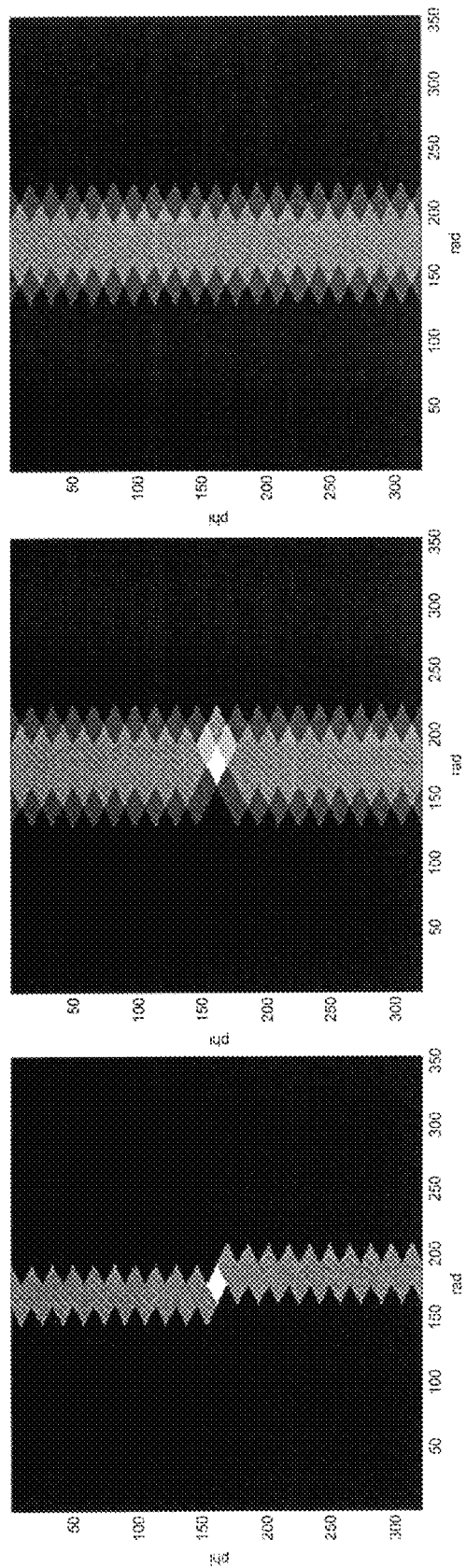

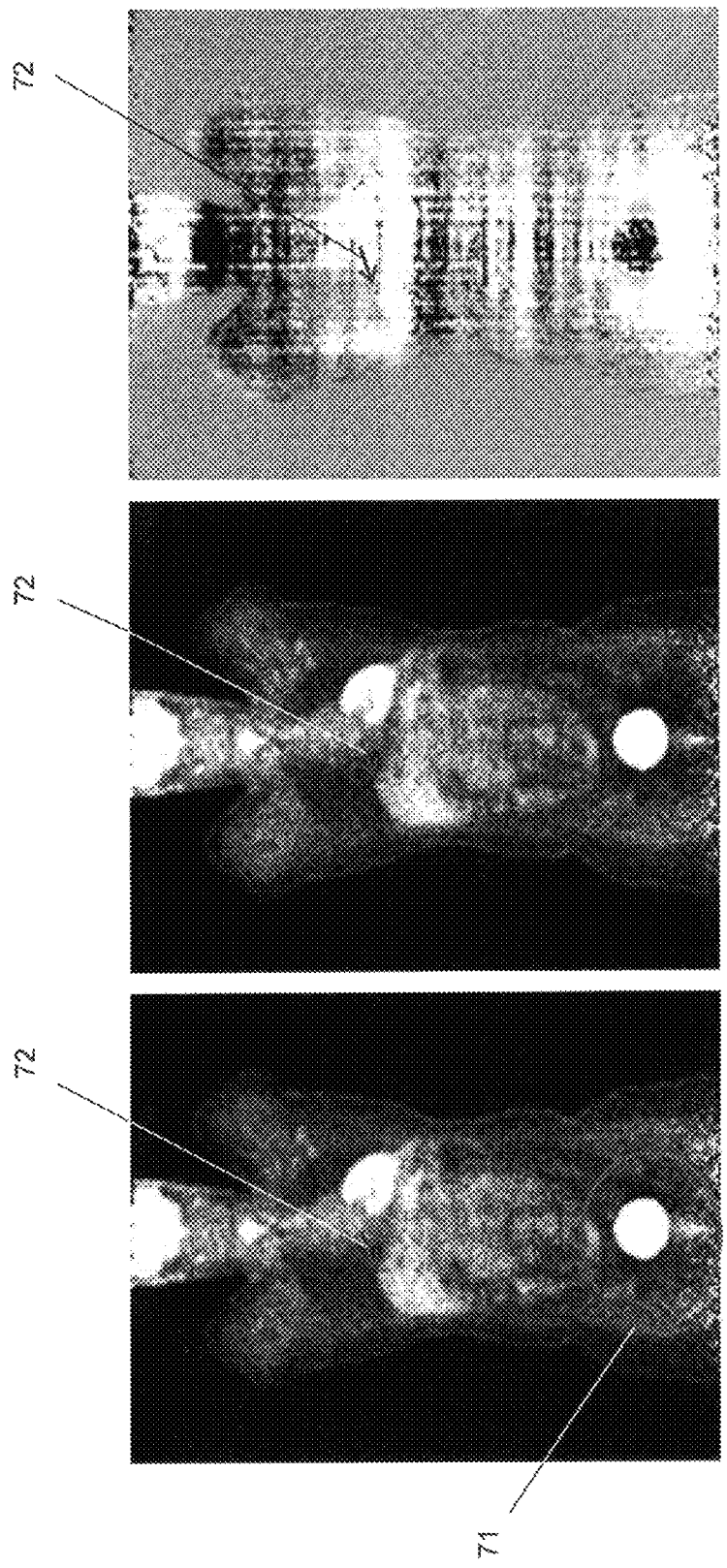

METHOD AND SYSTEM OF RANDOM-EVENT-BASED COUNT-RATE ADAPTIVE NORMALIZATION FOR PET DETECTOR EFFICIENCY

FIELD

The present disclosure generally relates to an apparatus and method for using obtained random paired events to estimate crystal efficiency correction factors for Positron Emission Tomography (PET).

CROSS-REFERENCE TO RELATED APPLICATIONS

The present application is related to and incorporates herein by reference the application "A CYLINDER SOURCE SOFTWARE-POSITIONING METHOD FOR PET CALIBRATION AND IMAGE QUALITY ASSURANCE", Ser. No. 14/084,304.

BACKGROUND

In PET, each line of response (LOR) has different sensitivity due to many factors, including crystal efficiency, geometry profile, and count-rate dependent block profile. If not corrected properly before image reconstruction, the variation in LOR sensitivity will lead to quantitative error and artifacts.

Component-based PET detector normalization approaches, in which the geometry profile, crystal efficiency, and detector block profile are estimated and corrected separately, have been widely attempted for 3D PET detector efficiency normalization.

For example, in component-based PET detector normalization, data is acquired at different count rates, and then used to generate different count-rate-dependent normalization coefficients (NCs) using true events only or prompt events (with random and scatter corrected events). Alternatively, data is acquired at a low count rate, and then extrapolated to a high count rate. A combination of the above two approaches has also been used. However, such techniques have significant drawbacks.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein:

FIGS. 2A, 2B and 2C illustrate a comparison for module pairs used in different algorithms;

FIGS. 5A, 5B, and 5C illustrate a retro-reconstructed patient image providing a comparison between different techniques;

DETAILED DESCRIPTION

Figure 1A:
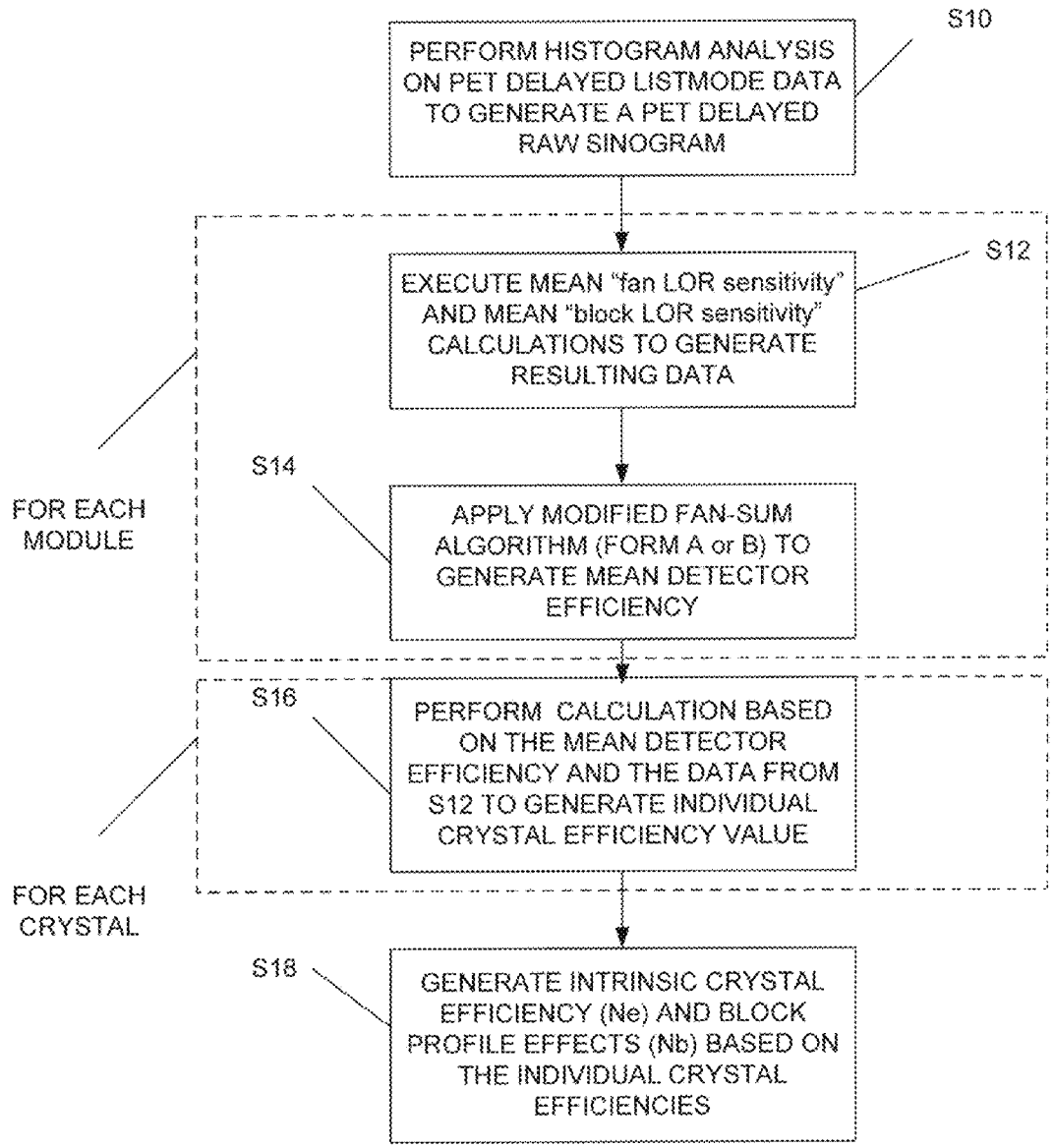
FIGS. 1A and 1B illustrate a process for generating crystal efficiency factors.

The present disclosure describes an apparatus and method for estimating crystal efficiency correction factors.

Embodiments disclosed herein provide for a method for generating crystal efficiency correction factors by performing a normalization calibration based on delayed data. The method includes the steps of obtaining delayed data from a scan of a patient using a Positron Emission Tomography (PET) scanner, generating a sinogram from the obtained delayed data, determining, using a processing circuit, mean fan and block line of response sensitivities from the generated sinogram, determining, using the processing circuit, mean detector efficiency based on the determined mean fan and block line of response sensitivities, determining, using the processing circuit, an individual crystal efficiency based on the determined mean fan and block line of response sensitivities and the mean detector efficiency for each module, and calculating the crystal efficiency correction factors based on the determined individual crystal efficiency of each module.

According to another embodiment of the method, the obtaining step further comprises increasing count statistics in delayed-window paired events.

According to another embodiment of the method, the increasing count statistics comprises at least one of increasing a data acquisition FOV, increasing a width of a coincidence window size for delayed window pairing, and increasing a module radiant FOV.

According to another embodiment of the method, the calculating step comprises calculating the crystal efficiency correction factors including intrinsic crystal efficiency (Ne) and block profile effects (Nb).

According to another embodiment, an additional method is provided for generating crystal efficiency correction factors by performing a normalization calibration based on delayed data. The method includes the steps of obtaining delayed data from a Positron Emission Tomography (PET) scanner, generating a sinogram from the obtained delayed data only, determining, using a processing circuit, mean fan and block line of response sensitivities from the generated sinogram, determining, using the processing circuit, mean detector efficiency based on the determined mean fan and block line of response sensitivities, determining, using the processing circuit, an individual crystal efficiency based on the determined mean fan and block line of response sensitivities and the mean detector efficiency for each module, and calculating the crystal efficiency correction factors based on the determined individual crystal efficiency of each module.

According to another embodiment of the additional method, the obtaining step further comprises increasing count statistics in delayed-window paired events.

According to another embodiment of the additional method, the increasing count statistics comprises at least one of increasing a data acquisition FOV, increasing a width of a coincidence window size for delayed window pairing, and increasing a module radiant FOV.

According to another embodiment of the additional method, the calculating step comprises calculating the crystal efficiency correction factors including intrinsic crystal efficiency (Ne) and block profile effects (Nb).

Embodiments disclosed herein provide an apparatus for generating crystal efficiency correction factors by performing a normalization calibration based on delayed data.

The apparatus includes processing circuitry that obtains delayed data from a scan of a patient using Positron Emission Tomography (PET) scanner, generates a sinogram from the obtained delayed data, determines mean fan and block line of response sensitivities from the generated sinogram, determines mean detector efficiency based on the determined mean fan and block line of response sensitivities, determines an individual crystal efficiency based on the determined mean fan and block line of response sensitivities and the mean detector efficiency for each module, and calculates the crystal efficiency correction factors based on the determined individual crystal efficiency of each module.

According to another embodiment of the apparatus, the processing circuitry increases count statistics in delayed-window paired events.

According to another embodiment of the apparatus, the processing circuitry increases count statistics by at least one of being configured to increase a data acquisition FOV, being configured to increase a width of a coincidence window size for delayed window pairing, and being configured to increase a module radiant FOV.

According to another embodiment of the apparatus, the processing circuitry obtains delayed data which corresponds to patient random paired event data.

According to another embodiment of the apparatus, the processing circuitry calculates the crystal efficiency correction factors including intrinsic crystal efficiency (Ne) and block profile effects (Nb).

According to another embodiment, an additional apparatus is provided for generating crystal efficiency correction factors by performing a normalization calibration based on delayed data.

The apparatus includes processing circuitry that obtains delayed data from a Positron Emission Tomography (PET) scanner, generates a sinogram from the obtained delayed data only, determines mean fan and block line of response sensitivities from the generated sinogram, determines mean detector efficiency based on the determined mean fan and block line of response sensitivities, determines an individual crystal efficiency based on the determined mean fan and block line of response sensitivities and the mean detector efficiency for each module, and calculates the crystal efficiency correction factors based on the determined individual crystal efficiency of each module.

According to another embodiment of the additional apparatus, the processing circuitry increases count statistics in delayed-window paired events.

According to another embodiment of the additional apparatus, the processing circuitry increases count statistics by at least one of being configured to increase a data acquisition FOV, being configured to increase a width of a coincidence window size for delayed window pairing, and being configured to increase a module radiant FOV.

According to another embodiment of the additional apparatus, the processing circuitry obtains delayed data which corresponds to patient random paired event data.

According to another embodiment of the additional apparatus, the processing circuitry calculates the crystal efficiency correction factors including intrinsic crystal efficiency (Ne) and block profile effects (Nb).

The present embodiments present a new adaptive method to generate crystal efficiency correction factors, such as crystal efficiency (Ne) and block profile effects (Nb), which compensate for the variations related to system count rate changes by using random data, which can be obtained either from delayed coincidence window or from single count rates.

Furthermore, a new technique to estimate mean detector efficiency is described in accordance with the use of random event data, which results in an estimation having a more uniform variance.

The present embodiments, for example, address the deficiencies of utilizing only patient data. For instance, the patient data, which suffers from more scatter and random events, is acquired differently from a calibration dataset. In addition, patient data is usually not acquired at the exact system count-rate used when performing data calibration.

In conventional systems, the normalization method for each crystal used only true events to estimate the average Ne and Nb according to all possible true LORs. Thus, the normalization coefficients (NCs) were estimated with photons with limited angles of incidence. This resulted in additional variations due to the position of each crystal, e.g., the crystals located at the axial end rings have larger variance in the Ne, Nb estimation because of the fewer number of true LOR numbers.

Furthermore, when outdated normalization coefficients, which were generated at the time of calibration, were used for patient data correction and reconstruction, significant drawbacks arose. For example, changes in the detector performance since the time of calibration resulted in a normalization that introduced additional errors.

In addition, previous normalization calibration procedures were complicated and required specific phantoms (e.g., a ring or cylinder source) at specific positions (e.g., center of the scanner). The data acquisition was required to cover a wide range of system count rates, which could be time-consuming and inefficient to calibrate.

Further, in previous methods of generating mean detector efficiency estimation, the module pairs used for the estimation were not uniformly distributed for different modules, which led to estimation with different variance properties.

As discussed above, the present embodiments describe a technique of using a patient's random paired events to estimate the crystal efficiency (Ne) and block profile effects (Nb). This technique has significant benefits. For example, random events do not include effects from scanner geometry, phantom geometry, or attenuation from the phantom. By using the patient's random events, the Ne, Nb estimations can be obtained in such a way that these estimations are unrelated to the crystal position in the module. This approach distinctively generates less noisy estimations for crystals at the axial edges of the scanner.

Furthermore, since the same patient data is used for normalization calibration, the present techniques minimize the unmatched system count rate effect in a "self-normalization" manner. In addition, the present technique is able to easily increase count statistics in delayed-window paired events, by, for example, a) increasing the data acquisition FOV, b) increasing the width of the coincidence window size for delayed window pairing, and c) increasing the module radiant FOV. These operations a)-c) are pre-set in order to optimize the acquired data statistics. However, these operations a)-c) can also be dynamically set. These operations a)-c) are applied with the delayed window data for self-normalization purposes.

For example, when paring acquired single photon events into listmode delayed window pairs for self-normalization, the FOV and coincidence window size can be set larger than the default protocols. The FOV size can be set up to the size of PET detector ring.

For delayed-window random estimation, the increase of coincidence window size will linearly increase the random data amount. Unlike conventional system, in which a separate phantom with limited size is used in normalization, which limits the module radiant FOV to a small number, in the present embodiments, the module radiant FOV is independent of the phantom size and can be increased to cover the entire acquisition FOV.

Moreover, because the efficiencies from different LORs are correlated, it is more accurate to use geometric mean estimation rather than arithmetic mean estimation as was used in conventional systems. The present embodiments utilize a combination of geometric mean and arithmetic mean estimations. Moreover, the combination may be weighted such that more geometric mean estimations are used than arithmetic mean estimations in the estimation of mean detector efficiency.

Figure 1B:
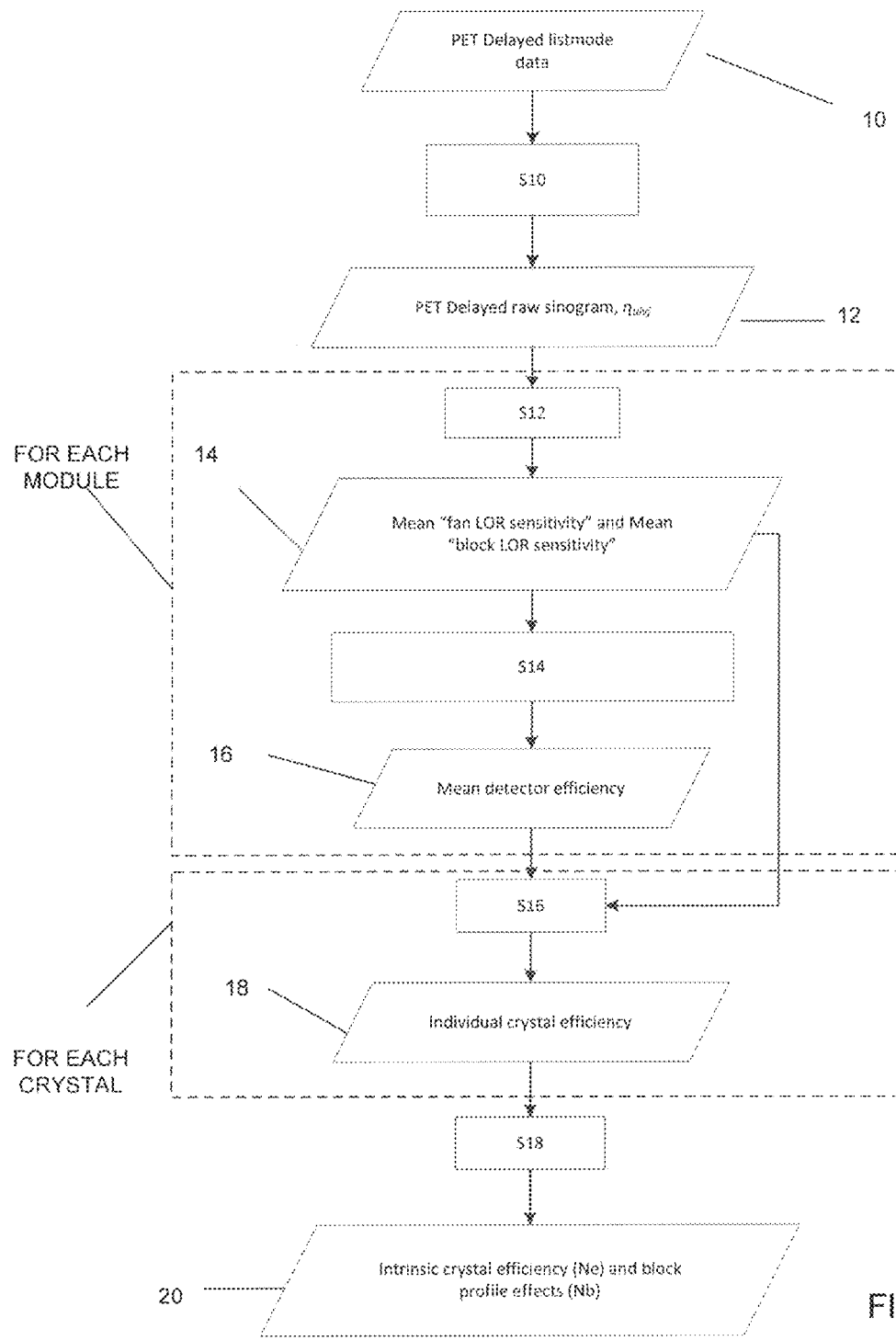

FIGS. 1A and 1B illustrate an embodiment by which crystal efficiency (Ne) and block profile effects (Nb) are generated.

In step S10, a histogram of the PET "delayed list-mode" data 10 is performed and this data is used to generate a sinogram, which is identified as a PET delayed raw sinogram 12. The PET "delayed list-mode" data is data representing delayed window-paired events (random events only). Random events do not include effects from the scanner geometry and the phantom geometry, or attenuation from the phantom. By using paired random events, the resulting crystal efficiency factors are unrelated to the line-of-response (LOR) location. This also ensures less noisy estimations for crystals at the axial edges of the scanner.

In step S12, mean "fan LOR sensitivity" and mean "block LOR sensitivity" calculations are performed using the PET delayed raw sinogram 12 to generate the mean "fan LOR sensitivity" and mean "block LOR sensitivity" values 14. The mean "fan LOR sensitivity" and mean "block LOR sensitivity" calculations are performed using Equations 1 and 2, respectively.

$$\langle \eta \rangle_{uiA} = \frac{1}{M} \sum_{j \in A} \eta_{uivj} \quad (1)$$

$$\langle \eta \rangle_{AB} = \frac{1}{M} \sum_{i \in B} \langle \eta \rangle_{uiA} = \frac{1}{M} \frac{1}{M} \sum_{j \in A} \sum_{i \in B} \eta_{uivj} \quad (2)$$

where $N_{uivj}$ represents the PET delayed raw sinogram 12. $\eta_{uivj}$ represents the efficiency of the LOR which connects the crystal i in ring u and the crystal j in ring v. $\epsilon_{ui}$ and $\epsilon_{vj}$ are the individual crystal efficiencies for the crystal i in ring u and the crystal j in ring v. In each transversal slice, the whole ring can be divided into several groups (modules) with each containing M consecutive detector. When assuming detector j belongs to group A, detector i belongs to group B, the mean "fan LOR sensitivity" and mean "block LOR sensitivity" can be defined in Equation 1 and 2. Specifically, $\langle \eta \rangle_{uiA}$ represents the mean "fan LOR sensitivity" and $\langle \eta \rangle_{AB}$ represents the mean "block LOR sensitivity." The term "fan" means a group of LORs, connecting one detector to a group opposite consecutive detectors. As shown in Equation 1, the "fan" LORs are those connecting crystal i in ring u and all the crystals in group A in ring v.

In step S14, the mean "fan LOR sensitivity" and mean "block LOR sensitivity" values 14 are used in the application of a modified fan-sum algorithm (form A or B) to generate mean detector efficiency 16. The fan sum is the sum of all of the LOR efficiencies between the respective crystal and opposing crystals belonging to the same group.

The modified 3D fan-sum algorithm can be implemented with two forms—form A or form B.

$$\langle \epsilon \rangle_A = \frac{1}{T-1} \sum_{p=-S}^{S-1} \left( \langle \eta \rangle_{A,(A+\frac{G}{2}+p)\% G} \prod_{k=0}^{\frac{G}{2}+p-1} \frac{\langle \eta \rangle_{(A+k)\% G,(A+k+\frac{G}{2}-p)\% G}}{\langle \eta \rangle_{(A+k+1)\% G,(A+k+\frac{G}{2}-p)\% G}} \right)^{1/2} \quad \text{Form A}$$

$$\langle \epsilon \rangle_A = \frac{1}{S} \sum_{p=0}^{S-1} \left[ \langle \eta \rangle_{A,(A+\frac{G}{2}+p)\% G} \langle \eta \rangle_{A,(A+\frac{G}{2}-p-1)\% G} \left( \prod_{k=0}^{\frac{G}{2}+p-1} \frac{\langle \eta \rangle_{(A+k)\% G,(A+k+\frac{G}{2}-p)\% G}}{\langle \eta \rangle_{(A+k+1)\% G,(A+k+\frac{G}{2}-p)\% G}} \right) \cdot \left( \prod_{k=0}^{\frac{G}{2}-p-2} \frac{\langle \eta \rangle_{(A+k)\% G,(A+k+\frac{G}{2}+p+1)\% G}}{\langle \eta \rangle_{(A+k+1)\% G,(A+k+\frac{G}{2}+p+1)\% G}} \right) \right]^{1/4} \quad \text{Form B}$$

where $\langle \epsilon \rangle_A$ represents the mean detector efficiency 16. T represents the module radiant FOV (moduleRADFOV). S is the maximum difference of moduleRADFOV, which is equal to (T-1)/2. The symbol "%" represents a module operator. "A" represents one group (module), p is the group difference index, k is the group index used to loop over all the groups in the estimation, G is the number of groups in a ring.

The present 3D fan-sum algorithm is modified from previous conventional algorithms. A significant improvement over the previous algorithms resulting from the modification is illustrated in FIGS. 2A-C. FIG. 2A illustrates the module pairs used for estimation resulting from a first conventional algorithm. FIG. 2B illustrates the module pairs used for estimation resulting from a second conventional algorithm. Finally, FIG. 2C illustrates the module pairs used for estimation resulting from a modified 3D fan-sum algorithm of the present disclosure. It should be evident from FIGS. 2A-C that the modules pairs used in FIG. 2C are more uniformly distributed. In each of FIGS. 2A-C, the values G=40, T=5, S=2, and A=0 were used in order to provide a consistent comparison.

In step 16, the mean detector efficiency 16 resulting from the 3D fan-sum algorithm is used along with the measured mean "fan LOR sensitivity" to generate individual crystal efficiency for each crystal 18. Specifically, the individual crystal efficiency for each crystal is calculated using Equation 3 shown below.

$$\epsilon_{ui} = \frac{1}{T}\sum_{q=-S}^{S} \frac{\langle \eta \rangle_{ui\left(A+\frac{G}{2}+q\right)\% G}}{\langle \epsilon \rangle_{\left(A+\frac{G}{2}+q\right)\% G}} \quad (3)$$

where $\epsilon_{ui}$ represents the individual crystal efficiency for each crystal 18. T represents the module radiant FOV (moduleRADFOV). S is equal to (T−1)/2. The symbol "%" represents a module operator. The nominator is obtained from the measurements. The denominator is obtained from Form A or Form B. "A" represents one group (module), "q" is the group difference index.

In step S18, the intrinsic crystal efficiency (Ne) and block profile effect (Nb) 20 are calculated from the individual crystal efficiencies 18. Specifically, the block profile effect (Nb) is generated in step S18 by obtaining the average over all the modules $$N_b(u, i^m) = \frac{1}{G}\sum_{k=0}^{G-1} \varepsilon_{u,i^m+kG}$$

in which G is the number of groups in a ring, m is the index of crystal in a group, k is the index of group.

The intrinsic crystal efficiency (Ne) is then determined based on the block profile effect (Nb). Specifically, the intrinsic crystal efficiency is calculated as:

$$N_e(u, i) = \frac{\varepsilon_{ui}}{N_b(u, i \% M)}$$

where $\epsilon_{ui}$ is estimated from Equation 3.

Steps S12 and S14 are performed for each module. Step S16 is performed for each crystal.

The present embodiments use only random events to estimate the intrinsic crystal efficiency (Ne) and the block profile effect (Nb) instead of true events. Furthermore, geometric mean estimation is used instead of arithmetic mean estimation. This approach provides a number of significant advantages.

Figure 3B:
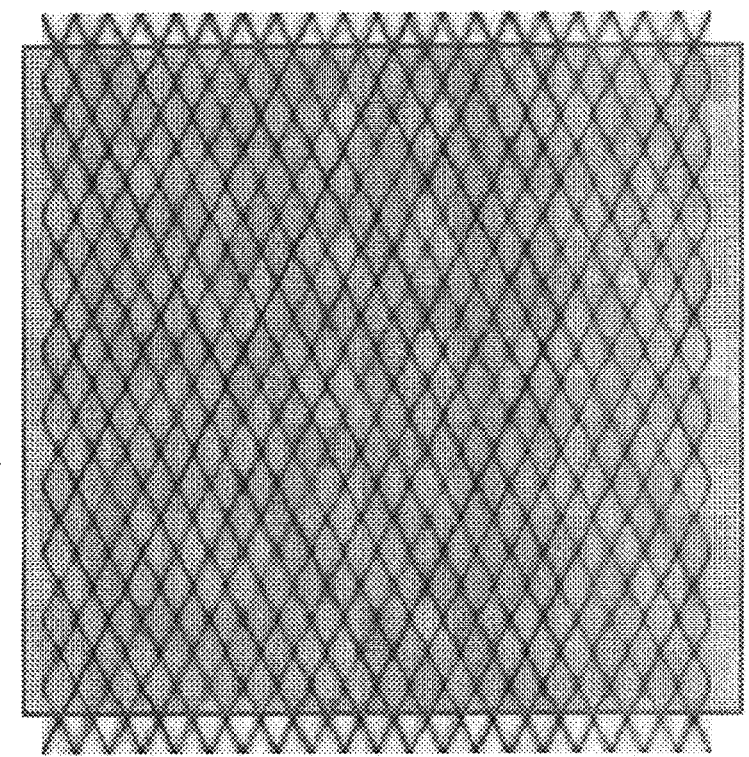
FIGS. 3A and 3B illustrate a significant increase in the module radiant FOV when using a delayed window.
Figure 3A:
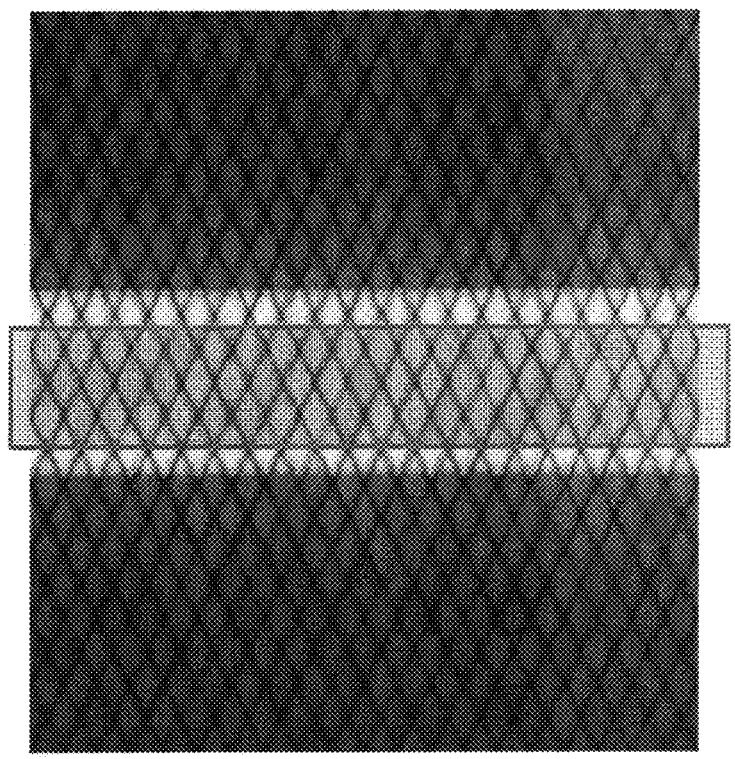

For instance, FIGS. 3A and 3B illustrate the significant increase in the module radiant FOV when using a delayed window (random events). In FIG. 3A, the module radiant FOV (moduleRADFOV)=3 as the prompt window of a cylinder phantom is used. In contrast, in FIG. 3B, the module radiant FOV (moduleRADFOV)=19 as the delayed window is used. Thus, by using the random data, the number of LOR used for calibration is dramatically increased.

As mentioned above, the present embodiments have other significant advantages. For example, the exact system count rate for each bed position data acquisition can be matched in a patient study, providing, in effect self-normalization. In addition, the crystal efficiency estimation is insensitive to the crystal position in the scanner and reconstruction error and artifacts caused by outdated normalization coefficients (NC) files can be avoided.

In addition, the better normalization provided by the present embodiments increases the accuracy of the model-based scatter correction (e.g., in the fitting process). Other advantages provided by the present methods are that the run-time calibration procedure is simple and that the estimated detector efficiency has a more uniform variance.

Further illustration of these advantages is found in FIGS. 4A-C, 5A-C, and 6.

Figure 4A:
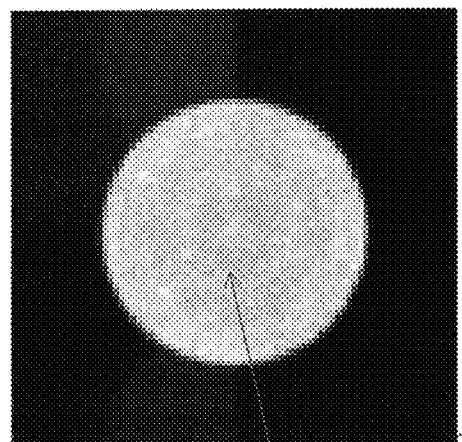
FIGS. 4A, 4B, and 4C illustrate the reduction in ring artifacts in the present embodiments.
Figure 4B:
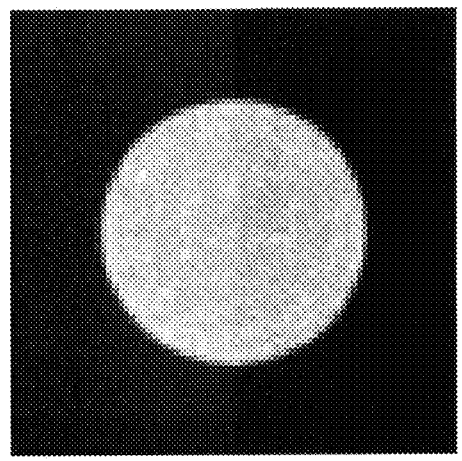
Figure 4C:
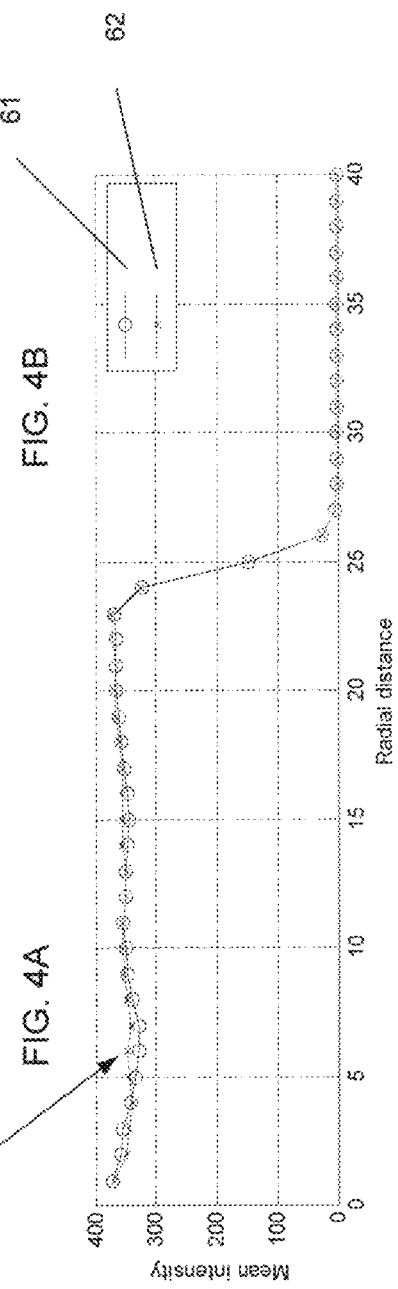

FIGS. 4A-C illustrate that ring artifacts are reduced by the present techniques. FIG. 4A illustrates a cylinder image according to previous methods. As is evident a ring artefact 60 is present in the image. In contrast, FIG. 4B illustrates a cylinder image according to the present techniques. No ring artifact 60 is present. This is further illustrated in FIG. 4C where the radial profile of the previous technique 61 is compared against the radial profile of the present embodiments 62.

FIGS. 5A-C illustrate a retro-reconstructed patient image. FIG. 5A illustrates a retro-reconstructed patient image resulting from the techniques of the present embodiments. FIG. 5B illustrates a retro-reconstructed patient image resulting from the previous methods. FIG. 5C illustrates the differences between the retro-reconstructed patient images of FIGS. 5A and 5B and specifically the image of FIG. 5B subtracted from the image of FIG. 5A. This figure clearly indicates the better definition of activity concentration at the regions indicated by arrows 72, where the count rate changes in two adjacent bed positions, e.g., the top region of the liver and better scatter correction. FIG. 5A has less "dark-hole" artifacts in the bladder region (circle 71).

Figure 6:
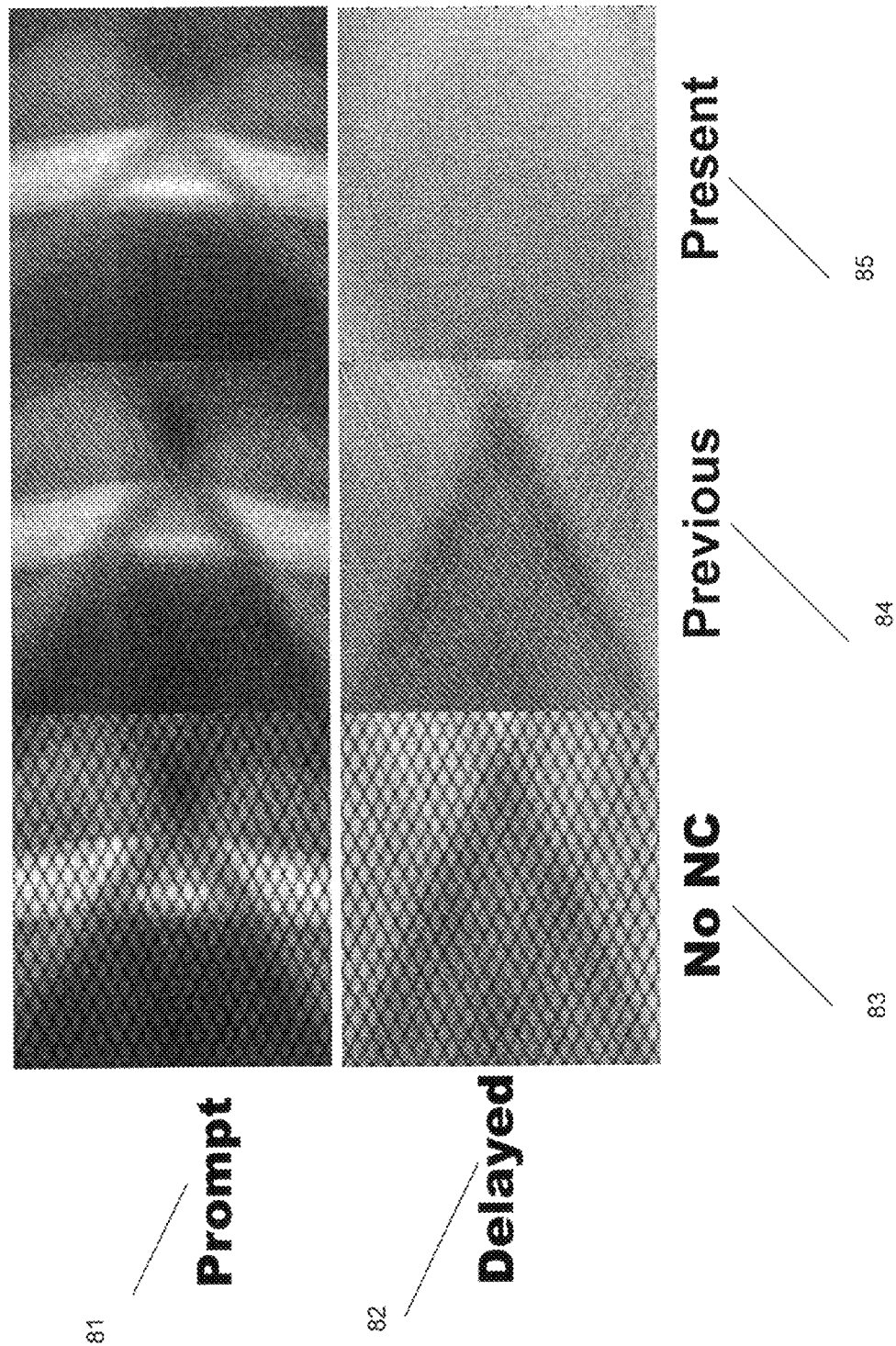
FIG. 6 illustrates a comparison between sinograms obtained with prompt list-mode data and sinograms obtained with only delayed (random) list-mode data.

FIG. 6 illustrates another example of the advantages of the presently described techniques. Specifically, this figure compares sinograms obtained with prompt list-mode data 81 with images obtained with only delayed (random) list-mode data 82. In addition, FIG. 6 compares, for each of the prompt list-mode data 81 and only delayed (random) list-mode data 82, the result of using no normalization coefficients 83, using the previous normalization techniques 84 and using the techniques of the present embodiments 85. As can be seen in FIG. 6, using the present techniques 85 with only delayed (random) list-mode data 82 results in a significantly improved image.

Figure 7:
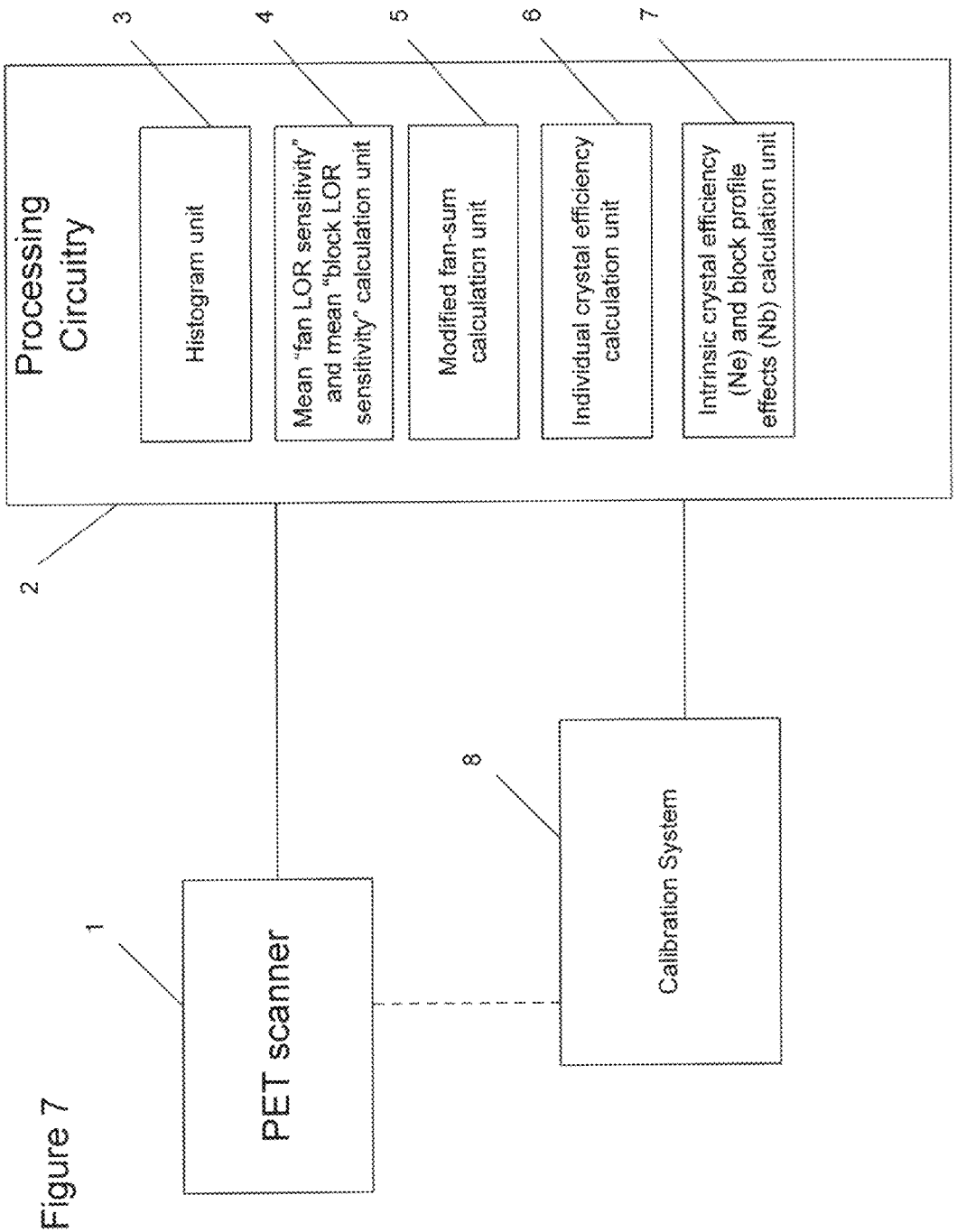
FIG. 7 illustrates an exemplary system for implementing the processes described above with reference to FIGS. 1A-B.

FIG. 7 illustrates an exemplary system for implementing the processes described above with reference to FIGS. 1A-B.

In the system of FIG. 7, the PET scanner 1 produces the PET delayed list-mode data 10. The data 10 is transmitted to the processing circuitry 2, which implements the generation of the crystal efficiency correction factors.

Specifically, the histogram unit 3 implements the histogramming of the delayed list-mode data 10 in step S10 described above to generate the PET delayed raw sinogram 12.

The mean "fan LOR sensitivity" and mean "block LOR sensitivity" unit 4 implements the mean "fan LOR sensitivity" and mean "block LOR sensitivity" calculation performed by Equations 1 and 2 using PET delayed raw sinogram 12 in step S12 described above. The mean "fan LOR sensitivity" and mean "block LOR sensitivity" unit 4 generates the mean "fan LOR sensitivity" and mean "block LOR sensitivity" values 14.

The modified fan-sum calculation unit 5 implements the application of the modified fan-sum algorithm (form A or B) as describes in step S14 to generate mean detector efficiency 16. The modified fan-sum calculation unit 5 generates the mean detector efficiency 16.

The individual crystal efficiency calculation unit 6 implements the calculation based on the mean detector efficiency and the mean "fan LOR sensitivity" and mean "block LOR sensitivity" values 14 to generate the individual crystal efficiency value 18 as is described with reference to step S16 above.

The intrinsic crystal efficiency (Ne) and block profile effects (Nb) calculation unit 7 generates the intrinsic crystal efficiency (Ne) and block profile effects (Nb) values 20 according the description associated with step S18 above.

The intrinsic crystal efficiency (Ne) and block profile effects (Nb) values 20 is transmitted to the calibration system 8, such as the system described in Ser. No. 14/084,304 noted above, which uses this information to calibrate the PET scanner 1.

All of the processing units described above, for example, the histogram unit, the mean "fan LOR sensitivity" and "block LOR sensitivity" calculation unit, the modified fan-sum calculation unit, the individual crystal efficiency calculation unit, and the intrinsic crystal efficiency (Ne) and block profile effects (Nb) calculation unit, which implement the processes or algorithms described above are implemented by some form of computer having one or more microprocessor or by using processing circuitry or specialized/dedicated circuitry or circuits. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 8:
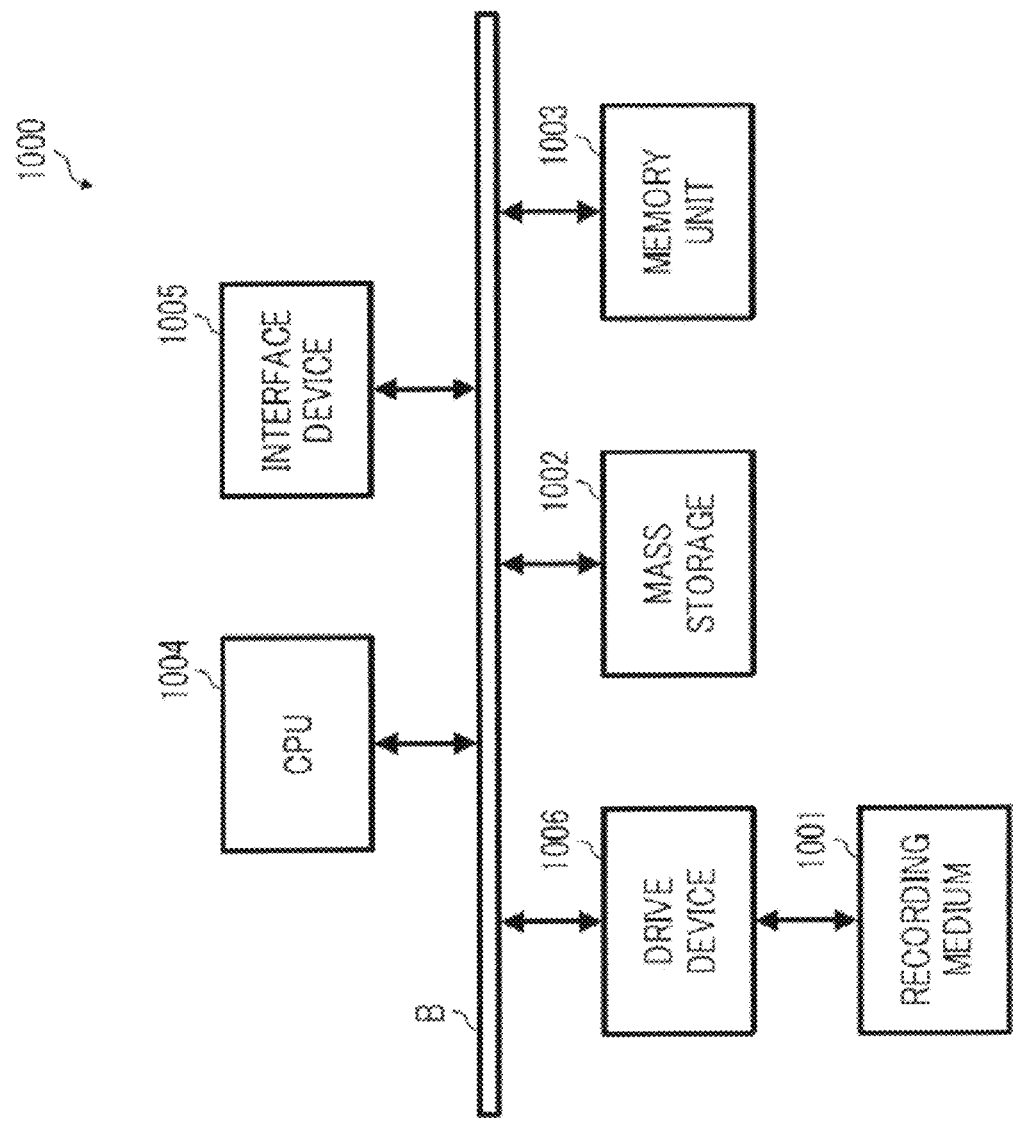
FIG. 8 illustrates a block diagram illustrating a computing device according to one embodiment.

In addition, certain features of the embodiments can be implemented using a computer based system (FIG. 8). The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method for generating crystal efficiency correction factors by performing a normalization calibration based on delayed data independent of a phantom in a Positron Emission Tomography (PET) apparatus, comprising:
    obtaining delayed data from a scan of a patient using modules of a PET;
    generating a sinogram from the obtained delayed data;
    determining, mean fan response sensitivity and block line response sensitivity based on the generated sinogram by using a processing circuit;
    determining, using the processing circuit, a mean detector efficiency for each module based on the determined mean fan response sensitivity and block line response sensitivity;
    determining, using the processing circuit, an individual crystal efficiency of each module based on the determined mean fan response sensitivity and block line response sensitivity and the mean detector efficiency;
    calculating the crystal efficiency correction factors based on the determined individual crystal efficiency; and
    calibrating the PET scanner by using the calculated crystal efficiency correction factors to reduce quantitative error and artifacts in image reconstruction by the PET apparatus,
    wherein each module is a detector having a plurality of crystals, and
    wherein the obtained delayed data corresponds to patient random paired event data.

2. The method according to claim 1, wherein the obtaining step further comprises increasing count statistics in delayed-window paired events.

3. The method according to claim 2, wherein the increasing count statistics comprises one or more selected from a group of increasing a data acquisition FOV, increasing a width of a coincidence window size for delayed window pairing, and increasing a module radiant FOV.

4. The method according to claim 1, wherein the calculating step comprises calculating the crystal efficiency correction factors including intrinsic crystal efficiency (Ne) and block profile effects (Nb).

5. A method for generating crystal efficiency correction factors by performing a normalization calibration based on delayed data independent of a phantom in a Positron Emission Tomography (PET) apparatus, comprising:
    obtaining delayed data from modules of a PET scanner;
    generating a sinogram from the obtained delayed data only;
    determining, mean fan response sensitivity and block line response sensitivity based on the generated sonogram by using a processing circuit;

determining, using the processing circuit, a mean detector efficiency for each module based on the determined mean fan response sensitivity and block line response sensitivity;

determining, using the processing circuit, an individual crystal efficiency of each module based on the determined mean fan response sensitivity and block line response sensitivity and the mean detector efficiency;

calculating the crystal efficiency correction factors based on the determined individual crystal efficiency; and calibrating the PET scanner by using the calculated crystal efficiency correction factors to reduce quantitative error and artifacts in image reconstruction by the PET apparatus, wherein each module is a detector having a plurality of crystals, and wherein the obtained delayed data corresponds to patient random paired event data.

6. The method according to claim 5, wherein the obtaining step further comprises increasing count statistics in delayed-window paired events.

7. The method according to claim 6, wherein the increasing count statistics comprises one or more selected from a group of increasing a data acquisition FOV, increasing a width of a coincidence window size for delayed window pairing, and increasing a module radiant FOV.

8. The method according to claim 5, wherein the calculating step comprises calculating the crystal efficiency correction factors including intrinsic crystal efficiency (Ne) and block profile effects (Nb).

9. A Positron Emission Tomography (PET) apparatus for generating crystal efficiency correction factors by performing a normalization calibration based on delayed data independent of a phantom, the apparatus comprising:

processing circuitry configured to:

obtain delayed data from a scan of a patient using modules of a PET scanner;

generate a sinogram from the obtained delayed data;

determine mean fan response sensitivity and block line response sensitivity based on the generated sonogram by using a processing circuit;

determine a mean detector efficiency for each module based on the determined mean fan response sensitivity and block line response sensitivity;

determine an individual crystal efficiency of each module based on the determined mean fan response sensitivity and block line response sensitivity and the mean detector efficiency; and calculate the crystal efficiency correction factors based on the determined individual crystal efficiency; and calibrate the PET scanner by using the calculated crystal efficiency correction factors to reduce quantitative error and artifacts in image reconstruction by the PET apparatus, wherein each module is a detector having a plurality of crystals, and wherein the obtained delayed data corresponds to patient random paired event data.

10. The apparatus according to claim 9, wherein the processing circuitry is configured to increase count statistics in delayed-window paired events.

11. The apparatus according to claim 10, wherein the processing circuitry is configured to increase count statistics by one or more selected from a group of being configured to increase a data acquisition FOV, being configured to increase a width of a coincidence window size for delayed window pairing, and being configured to increase a module radiant FOV.

12. The apparatus according to claim 9, wherein the processing circuitry is configured to calculate the crystal efficiency correction factors including intrinsic crystal efficiency (Ne) and block profile effects (Nb).

13. A Positron Emission Tomography (PET) apparatus for generating crystal efficiency correction factors by performing a normalization calibration based on delayed data independent of a phantom, comprising:

processing circuitry configured to:

obtain delayed data from modules of a PET scanner;

generate a sinogram from the obtained delayed data only;

determine mean fan response sensitivity and block line response sensitivity based on the generated sonogram by using a processing circuit;

determine a mean detector efficiency for each module based on the determined mean fan response sensitivity and block line response sensitivity;

determine an individual crystal efficiency of each module based on the determined mean fan response sensitivity and block line response sensitivity and the mean detector efficiency;

calculate the crystal efficiency correction factors based on the determined individual crystal efficiency; and calibrate the PET scanner by using the calculated crystal efficiency correction factors to reduce quantitative error and artifacts in image reconstruction by the PET apparatus, wherein each module is a detector having a plurality of crystals, and wherein the obtained delayed data corresponds to patient random paired event data.

14. The apparatus according to claim 13, wherein the processing circuitry is configured to increase count statistics in delayed-window paired events.

15. The apparatus according to claim 14, wherein the processing circuitry is configured to increase count statistics by one or more selected from a group of being configured to increase a data acquisition FOV, being configured to increase a width of a coincidence window size for delayed window pairing, and being configured to increase a module radiant FOV.

16. The apparatus according to claim 13, wherein the processing circuitry is configured to calculate the crystal efficiency correction factors including intrinsic crystal efficiency (Ne) and block profile effects (Nb).

* * * * *